(12) United States Patent
Solenthaler

(10) Patent No.: US 11,370,056 B2
(45) Date of Patent: Jun. 28, 2022

(54) ULTRASONIC WELDING APPARATUS WITH CLAMPING DEVICE

(71) Applicant: TELSONIC HOLDING AG, Bronschhofen (CH)

(72) Inventor: Peter Solenthaler, St. Margarethen (CH)

(73) Assignee: TELSONIC HOLDING AG, Bronschhofen (CH)

( * ) Notice: Subject to any disclaimer, the term of this patent is extended or adjusted under 35 U.S.C. 154(b) by 480 days.

(21) Appl. No.: 16/309,142

(22) PCT Filed: Jun. 14, 2017

(86) PCT No.: PCT/EP2017/064474
§ 371 (c)(1),
(2) Date: Dec. 12, 2018

(87) PCT Pub. No.: WO2017/216199
PCT Pub. Date: Dec. 21, 2017

(65) Prior Publication Data
US 2019/0224777 A1    Jul. 25, 2019

(30) Foreign Application Priority Data

Jun. 15, 2016 (DE) .................... 10 2016 210 590.6

(51) Int. Cl.
*B23K 20/10* (2006.01)
*H01R 43/02* (2006.01)
(Continued)

(52) U.S. Cl.
CPC .............. *B23K 20/10* (2013.01); *B23K 37/04* (2013.01); *H01R 43/0207* (2013.01);
(Continued)

(58) Field of Classification Search
CPC .............................. B23K 20/10; H01R 43/0207
See application file for complete search history.

(56) References Cited

U.S. PATENT DOCUMENTS 5,941,443 A * 8/1999 Steiner .................. B23K 20/10
228/1.1
6,202,915 B1 * 3/2001 Sato ........................ B23K 20/10
228/110.1
(Continued)

FOREIGN PATENT DOCUMENTS

DE   10 2006 021 651 B1   2/2008
EP        1 772 223 A1   4/2007
(Continued)

OTHER PUBLICATIONS

International Search Report Corresponding to PCT/EP2017/064474 dated Sep. 29, 2017.
(Continued)

*Primary Examiner* — Erin B Saad
*Assistant Examiner* — Carlos J Gamino
(74) *Attorney, Agent, or Firm* — Finch & Maloney PLLC; Michael J. Bujold; Jay S. Franklin

(57) ABSTRACT

An ultrasonic welding apparatus (50) includes a sonotrode (8) with a working surface (10), an anvil (4) with a working surface (11), which lies opposite the working surface (10) of the sonotrode (8), and two side delimiters (5, 6) with respective side delimiting surfaces (12, 13). The working surfaces (10, 11) and the side delimiting surfaces (12, 13) delimit a compression chamber (9) for placing an elongated welding material (60) in a welding material direction (B). The ultrasonic welding apparatus (50) has a clamping device (14), by which the anvil (4) is clamped at least in a welding position (S) by a clamping force, which acts on at least part of a side (15) of the engaging surface (26) of the anvil (4) that lies opposite the working surface (11) of the anvil (4), in the direction of the sonotrode (8). A method for ultrasonic welding is also disclosed.

12 Claims, 4 Drawing Sheets

(51) Int. Cl.
*H01R 43/28* (2006.01)
*B23K 37/04* (2006.01)
*B23K 103/10* (2006.01)
*B23K 103/12* (2006.01)
*B23K 101/38* (2006.01)

(52) U.S. Cl.
CPC .......... *H01R 43/28* (2013.01); *B23K 2101/38* (2018.08); *B23K 2103/10* (2018.08); *B23K 2103/12* (2018.08)

(56) References Cited

U.S. PATENT DOCUMENTS

| | | | | |
|---|---|---|---|---|
| 6,299,052 | B1* | 10/2001 | Wnek | B23K 20/10 228/110.1 |
| 6,336,803 | B1* | 1/2002 | Funger | B01J 19/10 156/580.2 |
| 2007/0023483 | A1* | 2/2007 | Yoneyama | B23K 20/10 228/110.1 |
| 2014/0138012 | A1* | 5/2014 | Spicer | B23K 20/26 156/64 |
| 2015/0303166 | A1* | 10/2015 | Momose | H01L 24/78 228/110.1 |

FOREIGN PATENT DOCUMENTS

| | | | | |
|---|---|---|---|---|
| EP | 1772223 A1 * | 4/2007 | | H01R 43/0207 |
| JP | 2007-149421 A | 6/2007 | | |
| WO | WO-2012069413 A1 * | 5/2012 | | B23K 20/10 |

OTHER PUBLICATIONS

Written Opinion Corresponding to PCT/EP2017/064474 dated Sep. 29, 2017.

* cited by examiner

ULTRASONIC WELDING APPARATUS WITH CLAMPING DEVICE

This application is a National Stage completion of PCT/EP2017/064474 filed Jun. 14, 2017, which claims priority from German patent application serial no. 10 2016 210 590.6 filed Jun. 15, 2016.

FIELD OF THE INVENTION

The present invention relates to ultrasonic welding apparatus with a clamping device and a method for ultrasonic welding of a welding material, in particular of an elongated welding material, especially electrical conductors such as stranded conductors, or of terminals.

EP 1 772 223 A1 discloses a device for the ultrasonic bonding of electrical conductors, containing an anvil part, which can be displaced transversely by means of a guide to a working surface of a sonotrode. The guide extends transversely to the working surface across the working surface. In this known device, although lever forces and torques are reduced, so that the compression chamber has an especially rigid design and is only subject to slight deformations, in the case of larger cross sections of the stranded conductors requiring a compression chamber of a certain width, a bending of the anvil part may still occur, which under certain circumstances may result in welds of poor quality.

DE 10 2006 021 651 B4 relates to an ultrasonic welding station and a method for its operation. The welding station contains a sonotrode, a mating electrode (i.e., in other words an anvil) and two side delimiters, which enclose a compression chamber in a known manner and are movable relative to each other. The welding station contains clamping means for the clamping of the mating electrode with respect to the side delimiters, which are adjacent to it. In the specific exemplary embodiment, the clamping means are fashioned as a holding yoke. In this way, an air gap between the mating electrode and the side delimiters during the welding is avoided. Supposedly, in this way relatively large forces or pressures can be channeled into the compression chamber and relatively larger and higher quality cross sections can be welded in the welding material, since the conductor elements can be held particularly firmly in position. Yet also in this welding station a bending of the compression chamber cannot be effectively prevented, especially when large cross sections of stranded conductors are being welded.

SUMMARY OF THE INVENTION

Therefore, one object of the present invention is to provide an ultrasonic welding apparatus and a method for ultrasonic welding which does not have the drawbacks known in the prior art. In particular, the bending of the compression chamber should thus be prevented as much as possible, even when stranded conductors with relatively large cross sections are to be welded.

In a first aspect of the invention, these and other objects are solved by an ultrasonic welding apparatus, containing a sonotrode with a working surface, an anvil with a working surface, and two side delimiters with respective side delimiting surfaces. The working surface of the anvil lies opposite the working surface of the sonotrode. The working surfaces of the sonotrode and of the anvil and the side delimiting surfaces delimit a compression chamber, which is designed for inserting a welding material, in particular an elongated welding material in a welding material direction. The welding material may in particular be electrical conductors, such as stranded conductors. It may also be terminals. Here and in the following, the welding material direction shall be considered to be the direction of the welding material, especially a longitudinal direction of the elongated welding material.

According to the invention, the ultrasonic welding apparatus has a clamping device, by means of which the anvil can be clamped at least in a welding position by a clamping force in the direction of the sonotrode. The clamping force acts on at least part of an engaging surface of the anvil that lies opposite the working surface of the anvil.

In the meaning of the present invention, an engaging surface of the anvil is situated opposite the working surface of the anvil when the surface normals of the working surface and the engaging surface form an obtuse angle and at least a portion of the engaging surface projected perpendicularly onto the plane of the working surface is situated at least partly inside the working surface. An angle of 180° is also regarded as an obtuse angle here.

Due to the action of the clamping force on an engaging surface situated opposite the working surface, an especially advantageous application of force into the anvil and thus onto the welding material is possible. In this way, the bending of the compression chamber can be effectively prevented. Given a suitable arrangement of the engaging surface, a symmetrical application of force is possible in particular. An angle between the mentioned surface normals of 180° is preferred according to the invention, since then an especially effective application of force can occur.

In advantageous embodiments, the engaging surface is formed by an outer side of the anvil situated opposite the working surface of the anvil or by a portion of this outer side. These embodiments are especially easy to construct. An outer side situated opposite the working surface of the anvil can also have at least one step, wherein the engaging surface is also formed by only an outer side of the step situated opposite the working surface.

Alternatively, however, it is also conceivable and lies within the scope of the invention for the engaging surface to be arranged inside the anvil, i.e., between the working surface and the oppositely situated outer side of the anvil. For example, the anvil can be clamped in the direction of the sonotrode with the aid of a bolt penetrating into it from the side.

Advantageously, the clamping device is arranged and designed such that the anvil, at least in the welding position, can be clamped by a clamping force acting in the direction of the sonotrode, substantially on the entire engaging surface, especially on the entire oppositely situated outer side. In this way, an especially effective application of force can be accomplished. However, it is also possible in the scope of the invention for the clamping force to act only on a portion of the engaging surface.

Preferably, the clamping device, has a closing mechanism, which at least in the welding position can be brought into contact with at least a portion of the engaging surface, especially with the entire engaging surface, in order to clamp the anvil in the direction of the sonotrode. The clamping force may then be transmitted by the closing mechanism to the anvil. For example, the closing mechanism may be arranged on the outer side situated opposite the working surface of the anvil or be formed by a bolt, as described above. The closing mechanism may be configured as a bar, which allows an especially good application of force.

Preferably, the closing mechanism is arranged displaceably between an opening position and the welding position with respect to the sonotrode in a closing direction, wherein the closing direction runs parallel to the working surface of the sonotrode and perpendicular to the welding material direction. This simplifies the inserting of the welding material in the welding material direction. In the opening, position, the closing mechanism need not necessarily be in contact with the engaging surface.

Advantageously, the closing mechanism is arranged on the anvil displaceably in the closing direction. In this way, the closing mechanism can be positioned more precisely relative to the anvil, which simplifies the application of the clamping force. Alternatively, however, the closing mechanism can also be arranged on another portion of the ultrasonic welding apparatus displaceably in the closing direction.

It is likewise advantageous for the closing mechanism to be held at least in the welding position at two oppositely situated ends. In this way, a symmetrical application of force into the closing mechanism and thus into the anvil can be achieved. The application of force here thus occurs by a "gantry principle".

It is furthermore advantageous if the clamping device has at least one pulling device comprising a first pulling part and a second pulling part, wherein the clamping device is arranged displaceably relative to the sonotrode in a direction perpendicular to its working surface, wherein at least in the welding position a first end of the closing mechanism can be held by means of the first pulling part of the pulling device and the second end of the closing mechanism can be held by means of a second pulling part of the pulling device. By displacing the pulling device perpendicular to the working surface of the sonotrode, the height of the compression chamber can be adjusted in this way. For the inserting of the welding material, the pulling device can be moved up toward the working surface of the sonotrode, making it easier to look into the compression chamber. After this, the pulling device can be moved away from the working surface of the sonotrode, so that the closing mechanism can close the compression chamber above the inserted welding material. The adjustment path traveled by the pulling device may be chosen as a function of the overall cross section of the inserted welding material. If this overall cross section is relatively small, it may be enough for the pulling device to move for only part of the maximum possible adjustment path, so that the process times can be reduced. After this, the pulling device can again be moved up toward the working surface of the sonotrode in order to decrease the size of the compression chamber and perform the welding. This movement can be symmetrical by holding both ends of the closing mechanism.

A further advantage is that the anvil is arranged displaceably on the first pulling part in the aforementioned closing direction running parallel to the working surface of the sonotrode and perpendicular to the welding material direction. In this way, the compression chamber can be opened and closed.

It is expedient for the first pulling part to contain a cross beam running parallel to the welding material direction and at least two longitudinal seams running perpendicular to the working surface of the sonotrode. The cross beam is thereby designed to hold the first end of the closing mechanism at least in the welding position, and the longitudinal beams hold the cross beam, especially at its two ends. Between the longitudinal beams an opening is formed, through which the anvil, a first side delimiter and the closing mechanism can be guided into the gap formed between the pulling parts. The passage of the anvil, the side delimiter and the closing mechanism through the opening formed between the longitudinal beams ensures a compact and symmetrical design.

It is likewise expedient for the second pulling part to contain a cross beam running parallel to the welding material direction and at least two longitudinal beams running perpendicular to the working surface of the sonotrode. The cross beam is thereby arranged and designed to hold the second end of the closing mechanism at least in the welding position, and the longitudinal beams hold the cross beam, especially at its two ends. Between the longitudinal beams an opening is formed, through which a second side delimiter can be guided into the gap formed between the pulling parts. This passage also ensures a compact and symmetrical design.

Thus, on the whole, the clamping force can be introduced into the anvil via the longitudinal beams, the cross beam and the closing mechanism.

The closing mechanism may also have a temperature control device which can be used to control the temperature of the closing mechanism and thus the anvil, especially to cool or heat it. The temperature control device may contain a temperature control duct for a temperature control fluid, especially a coolant or a heating fluid, which can be a gas or a liquid, for example, such as water. Alternatively, the temperature control device may contain a Peltier element or a heating wire.

Furthermore, the closing mechanism may contain at least one sensor, with which a welding parameter can be determined, such as a force, a temperature or a position. In particular, a force sensor is preferably arranged in the closing mechanism, since it is then in the flow of forces. The mentioned sensors may serve for quality control. In this way, in particular, individual "missing strands" can be detected.

On the whole, the ultrasonic welding apparatus according to the invention has the advantage of being robust and compact.

In a second aspect, the invention also relates to a method for ultrasonic welding, which can be carried out in particular with an ultrasonic welding apparatus as described above. The method involves the following steps:

a) inserting of a welding material, in particular an elongated welding material, in a welding material direction into a compression chamber of an ultrasonic welding apparatus;

b) closing of the compression chamber to reach a welding position;

c) clamping of an anvil of the ultrasonic welding apparatus by a clamping force, which acts on at least one portion of an engaging surface of the anvil situated opposite a working surface of the anvil, in the direction of a sonotrode of the ultrasonic welding apparatus;

d) welding of the welding material (60) by subjecting it to ultrasound.

As already explained above, in this way a bending of the compression chamber can be prevented for the most part.

Advantageously, the anvil in step c) is clamped by a clamping force acting substantially on the entire engaging surface in the direction of the sonotrode.

It is furthermore advantageous in step c) for a closing mechanism to be brought into contact with at least one portion of the engaging surface, especially with the entire engaging surface, in order to clamp the anvil in the direction of the sonotrode.

Furthermore, it is expedient in step b) for the closing mechanism to be displaced relative to the sonotrode in a closing direction, running parallel to a working surface of the sonotrode and perpendicular to the welding material direction, from an opening position to a welding position.

It is furthermore advantageous in step h) for the anvil to be displaced in said closing direction.

The method according to the invention is also especially suitable for a cascade welding or a sequential welding, in which welding material, especially stranded conductors, made of different materials such as copper or aluminum are welded. It is advantageous, for example, to first weld one or more copper stranded conductors with a first set of welding parameters, and then to open the compression chamber once more, insert one or more aluminum stranded conductors in addition, and then weld together all stranded conductors with a second set of welding parameters.

The ultrasonic welding may be a linear or a torsional ultrasonic welding. The sonotrodes for this may be designed in a known manner.

BRIEF DESCRIPTION OF THE DRAWINGS

In the following, the invention shall be explained more closely with the aid of several exemplary embodiments and drawings. In the drawings.

DETAILED DESCRIPTION OF THE PREFERRED EMBODIMENTS

Figure 1:
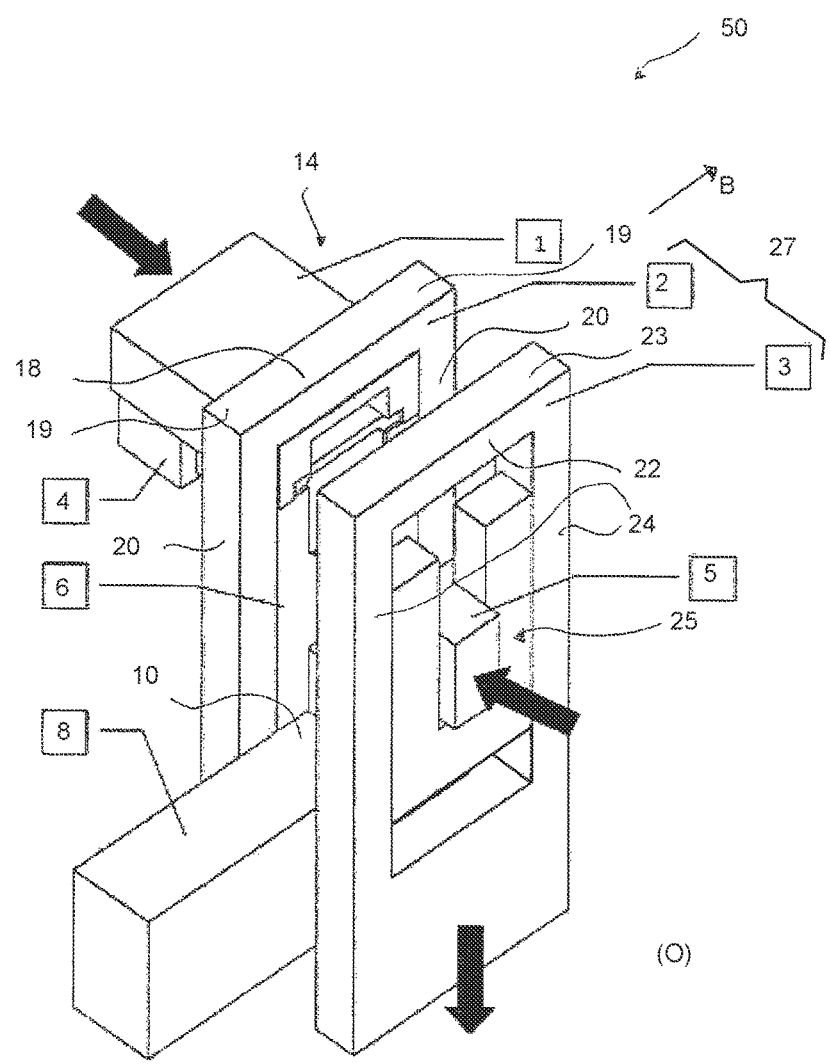
FIG. 1: shows a perspective view of an ultrasonic welding apparatus according to the invention in an opening position.

The ultrasonic welding apparatus 50 according to the invention that is represented in FIGS. 1 to 4 contains a sonotrode 8 with a working surface 10, an anvil 4 with a working surface 11, which lies opposite the working surface 10 of the sonotrode 8, as well as a first side delimiter 6 and a second side delimiter 5 with respective side delimiting surfaces 12, 13. The working surfaces 10, 11 of the sonotrode 8 of and of the anvil 4 and the side delimiting surfaces 12, 13 delimit a compression chamber 9, which is designed for inserting of welding material 60 in a welding material direction B.

The ultrasonic welding apparatus 50 moreover comprises a clamping device 14. By means of this clamping device 14, the anvil 4 can be clamped in the welding position S represented in FIGS. 2 and 4 by a clamping force in the direction of the sonotrode 8. The clamping force acts on an engaging surface 26 of the anvil 4, situated opposite its working surface 11. In this exemplary embodiment, the engaging surface 26 is formed by an outer side 15 of the anvil 4 situated opposite the working surface 11. The surface normal N of the working surface 11 and the surface normal M of the engaging surface 26 thus form an angle of 180°, and the engaging surface 26 projected perpendicularly onto the plane of the working surface 11 lies partly within the working surface 11.

Figure 2:
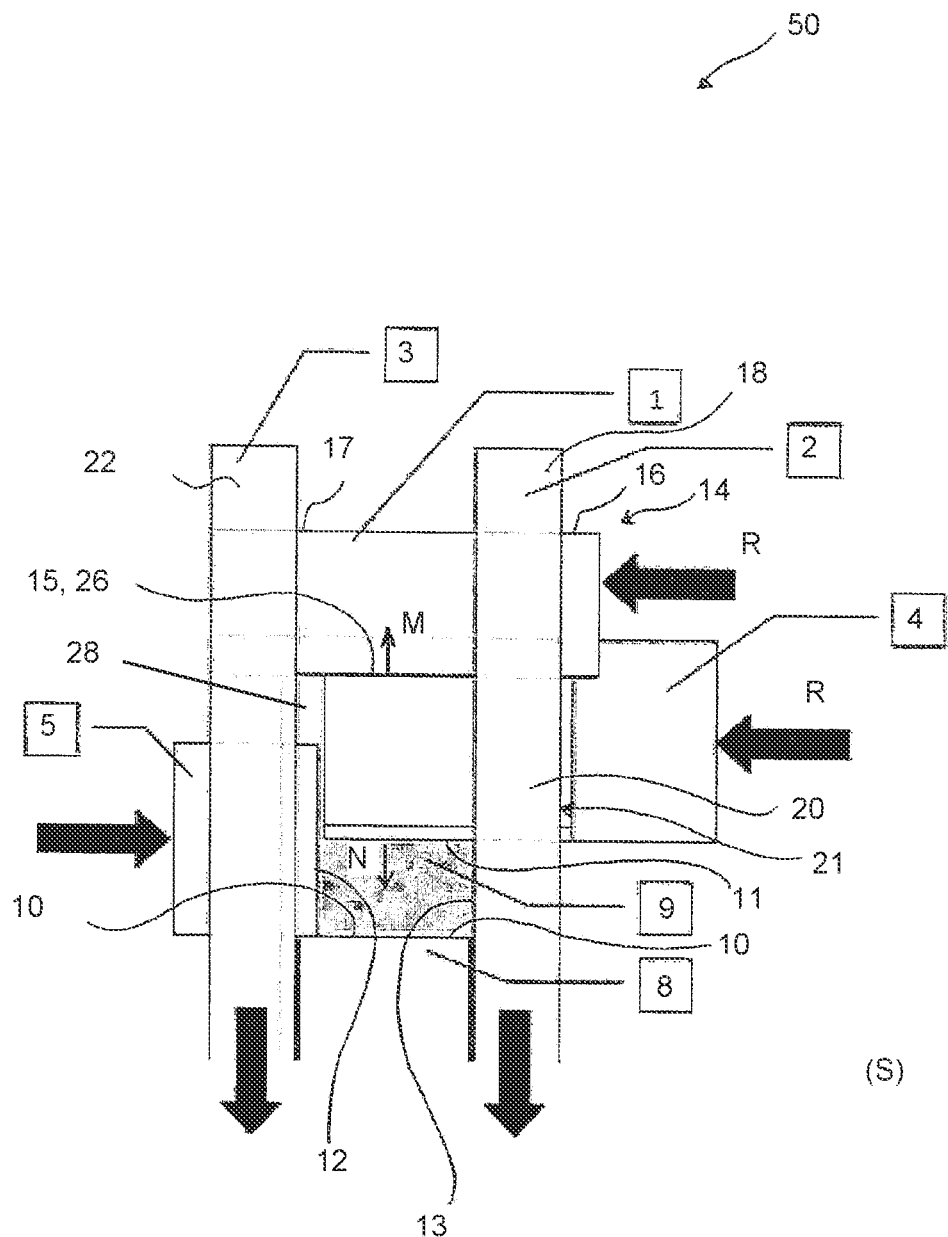
FIG. 2: shows a side view of the ultrasonic welding apparatus in a welding position.
Figure 4:
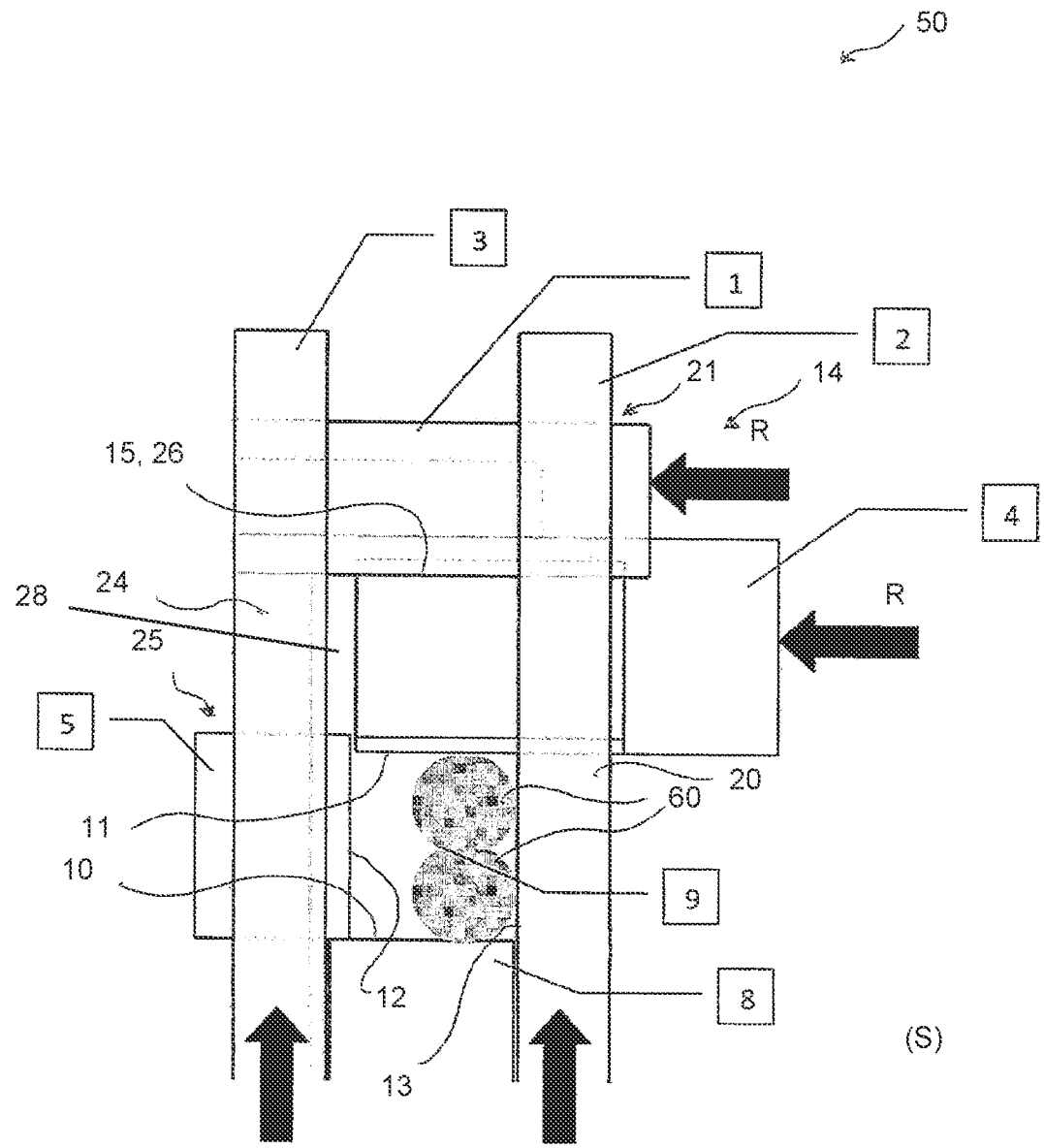
FIG. 4: shows a side view of the ultrasonic welding apparatus in the welding position with inserted welding material.

The clamping device 14 has a pulling device 27 comprising a first pulling part 2 and a second pulling part 3. The pulling device 27 is arranged displaceably relative to the sonotrode 8 in a direction perpendicular to its working surface 10. Furthermore, the clamping device 14 comprises a bar-shaped closing mechanism 1, which in the welding position S represented in FIGS. 2 and 4 is in contact with the engaging surface 26, in order to clamp the anvil 4 in the direction of the sonotrode 8. In the welding position S, a first end 16 of the closing mechanism 1 can be held by means of the first pulling part 2 of the pulling device, and a second end 17 of the closing mechanism 1 can be held by means of the second pulling part 3 of the pulling device.

More precisely, the first pulling part 2 contains a cross beam 18 running parallel to the welding material direction B, which holds the first end 16 of the closing mechanism 1 in the welding position S. Furthermore, the first pulling part 2 contains two longitudinal beams 20 running perpendicular to the working surface 10 of the sonotrode 8, which hold the cross beam 18, namely at its two ends 19. Between the longitudinal beams 20 there is formed an opening 21, through which the anvil 4, the first side delimiter 6 and the closing mechanism 1 can be guided into the gap 28 formed between the pulling parts 2, 3.

Similarly, the second pulling part 3 contains a cross beam 22 running parallel to the welding material direction B, which holds the second end 17 of the closing mechanism 1 in the welding position S. Two longitudinal beams 24 running perpendicular to the working surface 10 of the sonotrode 8 hold the cross beam 22 at its two ends 23. Between the longitudinal beams 24 there is formed an opening 25, through which the second side delimiter 5 can be guided into the gap 28 formed between the pulling parts 2, 3 in order to delimit the compression chamber 9.

Figure 3:
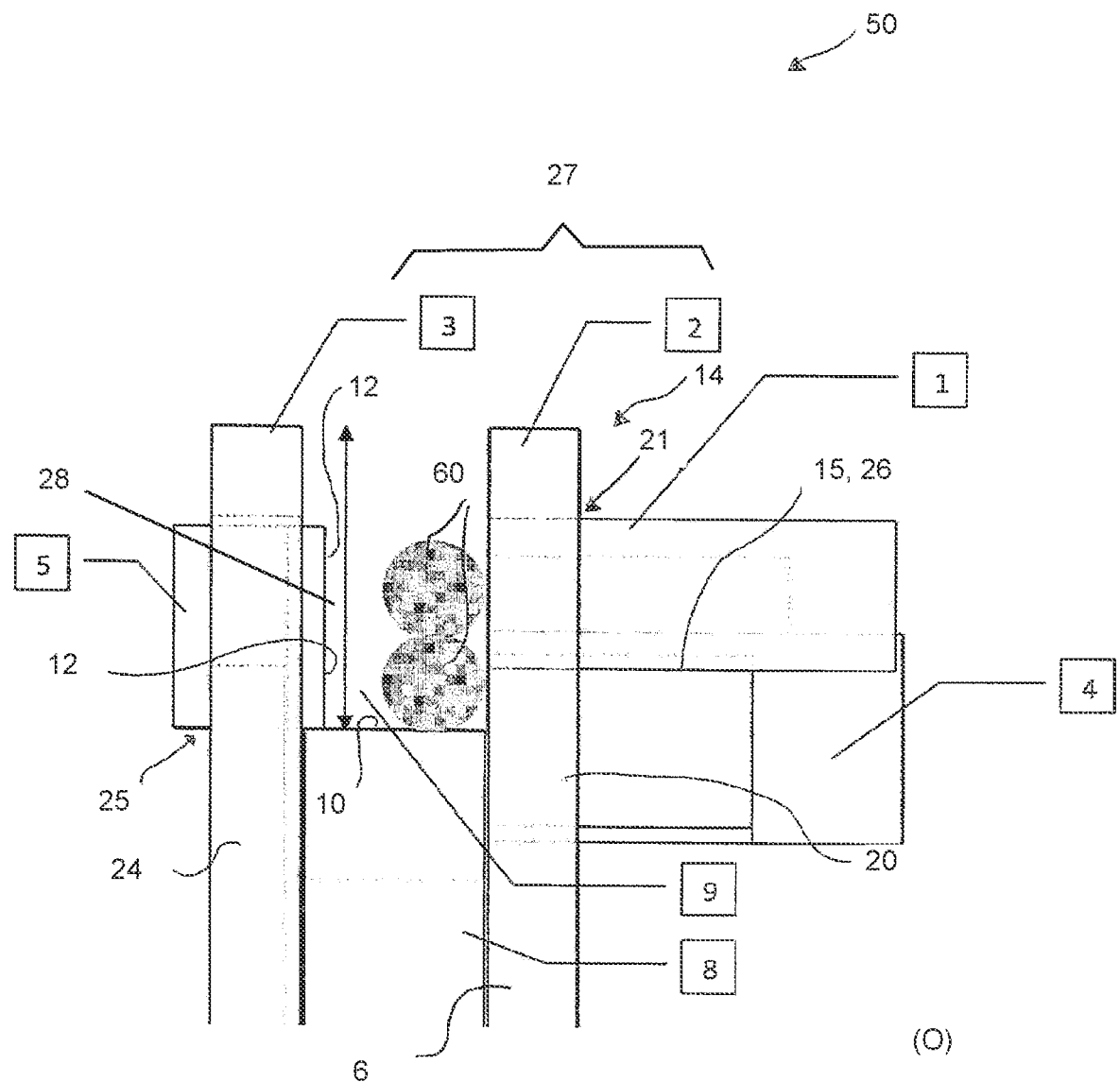
FIG. 3: shows a side view of the ultrasonic welding apparatus in the opening position with inserted welding material.

The closing mechanism 1 is arranged on the anvil 4 displaceably relative to the sonotrode 8 in a closing direction R, running parallel to the working surface 10 of the sonotrode 8 and perpendicular to the welding material direction B, between an opening position O represented in FIGS. 1 and 3 and the welding position S represented in FIGS. 2 and 4. The anvil 4 for its part is arranged on the first pulling part 2 displaceably in the mentioned closing direction R. In the welding position S shown in FIGS. 2 and 4, the anvil 4 is clamped by a clamping force acting substantially on the entire engaging surface 26 in the direction of the sonotrode 8.

For the ultrasonic welding with the aid of this ultrasonic welding apparatus 50, at first in a step a) welding material 60, such as two stranded conductors for example, can be inserted in a welding material direction B into the compression chamber 9, in place of the two stranded conductors 60 shown in FIGS. 3 and 4 it is of course also possible to weld three or more stranded conductors. In order to make this insertion possible and easier, the anvil 4 together with the closing mechanism 1 is previously extracted through the opening 21 from the gap 28 between the two pulling parts 2, 3, and the pulling device is moved up in the direction of the sonotrode 8. Thus, the opening position O represented in FIG. 3 is achieved. The arrangement of the individual components of the ultrasonic welding apparatus 50 in the opening position O thereby allows a good view of the compression chamber 9 and the welding material 60 from above.

Next, in a step h) the compression chamber 9 is closed by moving the pulling device away from the sonotrode 8. The adjustment path of the pulling device may be chosen as a function of the overall cross section of the inserted stranded conductors 60. After this, the anvil 4 and the closing mechanism 1 are moved relative to the sonotrode 8 in the closing direction R through the opening 21 into the gap 28 between the pulling parts 2, 3. Previously, at the same time, or afterwards, the second side delimiter 5 is introduced through the opening 25 into the gap 28. After this, the pulling device is lowered once more, and the anvil 4 and the side delimiter 5 can be moved further, if so desired. On the whole, this yields the welding position S shown in FIG. 4. In this welding positionS, the anvil 4 is clamped by a clamping force in the direction of the sonotrode 8. The force is transmitted via the pulling device, the closing mechanism 1 and the anvil 4.

Due to its construction, the ultrasonic welding apparatus 50 according to the invention is especially robust and compact, and a symmetrical application of force is accomplished. In this way, the ultrasonic welding apparatus 50 is especially suitable for the welding of welding material, especially stranded conductors, with large cross section perpendicular to an insertion direction E.

The invention claimed is:

1. An ultrasonic welding apparatus containing:
   a sonotrode with a working surface,
   an anvil with a working surface and an opposite engaging surface,
   wherein, in a welding position of the anvil, the anvil and the sonotrode are arranged such that, in a direction of the sonotrode, the working surface of the anvil overlays the working surface of the sonotrode, and
   two side delimiters with respective side delimiting surfaces,
   wherein the working surfaces of the sonotrode and of the anvil and the side delimiting surfaces delimit a compression chamber, which is designed for inserting a welding material in a welding material direction, and
   a clamping device which applies a clamping force to a portion of the engaging surface of the anvil in the direction of the sonotrode to clamp the anvil in the welding position by the clamping force,
   wherein the clamping device has a closing mechanism, which in the welding position, is brought into contact with at least the portion of the engaging surface in order to clamp the anvil in the direction of the sonotrode,
   wherein, in the welding position, the portion of the engaging surface of the anvil in contact with the closing mechanism overlays, in the direction of the sonotrode, the working surface of the anvil and the working surface of the sonotrode, and
   wherein the closing mechanism is displaceable with respect to the sonotrode from an opening position to the welding position in a closing direction, and the closing direction extends parallel to the working surface of the sonotrode and perpendicular to the welding material direction.

2. The ultrasonic welding apparatus according to claim 1, wherein the engaging surface is formed by an outer side of the anvil situated opposite the working surface of the anvil or by a portion of the outer side.

3. The ultrasonic welding apparatus according to claim 1, wherein the clamping device is arranged and designed such that the anvil, in the welding position, is clamped by the clamping force acting in the direction of the sonotrode, substantially on an entirety of the engaging surface.

4. The ultrasonic welding apparatus according to claim 1, wherein the closing mechanism is displaceably arranged on the anvil in the closing direction.

5. The ultrasonic welding apparatus according to claim 1, wherein the closing mechanism, in the welding position, is held at two oppositely situated ends.

6. The ultrasonic welding apparatus according to claim 1, wherein the clamping device has a pulling device comprising a first pulling part and a second pulling part, wherein the clamping device is displaceably arranged relative to the sonotrode in a direction perpendicular to the working surface of the sonotrode, and in the welding position, a first end of the closing mechanism is held by the first pulling part of the pulling device, and a second end of the closing mechanism is held by the second pulling part of the pulling device.

7. The ultrasonic welding apparatus according to claim 6, wherein the anvil is displaceably arranged on the first pulling part in a closing direction running parallel to the working surface of the sonotrode and perpendicular to the welding material direction.

8. The ultrasonic welding apparatus according to claim 6, wherein the first pulling part contains:
   a cross beam that extends parallel to the welding material direction, which is arranged and designed to abut and hold the first end of the closing mechanism in the welding position,
   two longitudinal beams that extend perpendicular to the working surface of the sonotrode, the two longitudinal beams are fixed to and hold the cross beam and between the two longitudinal beams an opening is formed, through which the anvil, a first side delimiter and the closing mechanism are guided into a gap formed between the first and the second pulling parts.

9. The ultrasonic welding apparatus according to claim 8, wherein the two longitudinal beams of the first pulling part are fixed to and hold opposite ends of the cross beam.

10. The ultrasonic welding apparatus according to claim 6, wherein the second pulling part contains:
    a cross beam that extends parallel to the welding material direction, which is arranged and designed to abut and hold the second end of the closing mechanism in the welding position, and
    two longitudinal beams that extend perpendicular to the working surface of the sonotrode, the two longitudinal beams are fixed to and hold the cross beam and between the two longitudinal beams an opening is formed, through which a second side delimiter is guided into a gap formed between the first and the second pulling parts.

11. The ultrasonic welding apparatus according to claim 10, wherein the two longitudinal beams of the second pulling part are fixed to and hold opposite ends of the cross beam.

12. An ultrasonic welding apparatus containing:
    a sonotrode with a working surface,
    an anvil with a working surface and an opposite engaging surface,
    wherein the working and the engaging surfaces of the anvil extend parallel to each other and in a direction perpendicular to the working surface of the sonotrode,
    two side delimiters with respective side delimiting surfaces,
    the working surfaces of the sonotrode and of the anvil and the side delimiting surfaces delimit a compression chamber which receives a welding material in a welding material direction,
    a clamping device which applies a clamping force to a portion of the engaging surface of the anvil in the direction perpendicular to the working surface of the sonotrode to clamp the anvil in a welding position, and
    wherein the clamping device has a closing mechanism, which in the welding position, is brought into contact with at least the portion of the engaging surface in order to clamp the anvil in the direction of the sonotrode, wherein in the welding position, the portion of the engaging surface of the anvil in contact with the closing mechanism projects, in the direction of the sonotrode, on the working surfaces of the anvil and the sonotrode, and wherein the closing mechanism is displaceable with respect to the sonotrode from an opening position to the welding position in a closing direction, and the closing direction extends parallel to the working surface of the sonotrode and perpendicular to the welding material direction.

\* \* \* \* \*